United States Patent [19]

Legris

[11] 3,999,783
[45] Dec. 28, 1976

[54] CONNECTOR FOR FLUID CONDUITS, SUCH AS SEMI-RIGID PIPE

[75] Inventor: André Legris, St-Maur, France

[73] Assignee: Ste. Legris France S.A., Ozoir-la-Ferriere, France

[22] Filed: Mar. 21, 1975

[21] Appl. No.: 560,734

Related U.S. Application Data

[63] Continuation of Ser. No. 450,679, March 13, 1974, abandoned.

[30] Foreign Application Priority Data

Apr. 24, 1973 France .............................. 73.14829

[52] U.S. Cl. .................................. 285/24; 285/243; 285/323
[51] Int. Cl.² ......................................... F16L 17/00
[58] Field of Search .............. 285/27, 24, 105, 104, 285/249, 248, 243, 256, 257, 258, 322, 382.7, 323

[56] References Cited

UNITED STATES PATENTS

| | | |
|---|---|---|
| 1,225,777 | 5/1917 | Craig .................................. 285/27 |
| 2,000,481 | 5/1935 | Harrison ............................ 285/248 |
| 2,031,825 | 2/1936 | Eastman ............................ 285/243 |
| 2,032,297 | 2/1936 | Mikulasek ......................... 285/243 |
| 2,071,478 | 2/1937 | Wick ................................. 285/258 |
| 2,346,051 | 4/1944 | Seamark ............................ 285/104 |
| 3,429,596 | 2/1969 | Marshall ......................... 285/27 X |
| 3,454,290 | 7/1969 | Tairraz ............................. 285/249 |
| 3,525,542 | 8/1970 | Belart et al. ..................... 285/256 |
| 3,653,689 | 4/1972 | Sapy et al. ........................ 285/322 |
| 3,743,326 | 7/1973 | Courtot et al. ................... 285/105 |

FOREIGN PATENTS OR APPLICATIONS 1,024,537 3/1966 United Kingdom ............... 285/105

*Primary Examiner*—Thomas F. Callaghan
*Attorney, Agent, or Firm*—Stevens, Davis, Miller & Mosher

[57] ABSTRACT

This invention relates to a connector for fluids, such as semi-rigid pipes. The connector includes a body member, a ring received in the body member, a clamp with pipe engaging jaws and a guide for guiding the pipe into the connector.

2 Claims, 6 Drawing Figures

CONNECTOR FOR FLUID CONDUITS, SUCH AS SEMI-RIGID PIPE

This is a continuation of application Ser. No. 450,679, filed Mar. 13, 1974, and now abandoned.

The present invention relates to a connector for fluid conduits, such as semi-rigid pipes.

From French patent specification No. 69/17,467 there is known a device for connecting fluid conduits, more particularly semi-rigid pipes, wherein a ring engaged in an opening of a connector body internally receives a flexible clamp having a plurality of jaws which are capable of being engaged in the wall of the conduit to be connected, the ring having in its bore a diverging zone disposed inwardly of the connector for the purpose of tightening the jaws of the clamp. Sealing is ensured by an O-ring of elastomer disposed between the body and the pipe.

According to the present invention there is provided a connector for a fluid conduit, such as a semi-rigid pipe, such a connector comprising a body member having an opening therein, a ring adapted to be received in the opening of the body member, a flexible clamp adapted to be received in the ring, the clamp including a plurality of jaws capable of engaging the walls of a pipe to be connected, the ring being provided with a flared portion for forcing the jaws of the clamp into engagement with the walls of a pipe, an O-ring seal for sealing the pipe with respect to the connector and a guide for guiding the pipe into the connector.

The guide may be in the form of an annular member adapted to engage the pipe externally or a lining adapted to be received internally of the pipe.

When the guide is in the form of a lining it holds the pipe internally in a circular manner and ensures greater rigidity. This improvement can be utilised in the case of elevated temperatures and in the case of an abrupt elbow at the outlet of the coupling. It prevents extrusion of the pipe by the O-ring or the lip of the clamp at any temperature and throughout the period of utilisation.

Illustrative embodiments of the present invention will now be described with reference to the accompanying drawings, in which.

Figure 1:
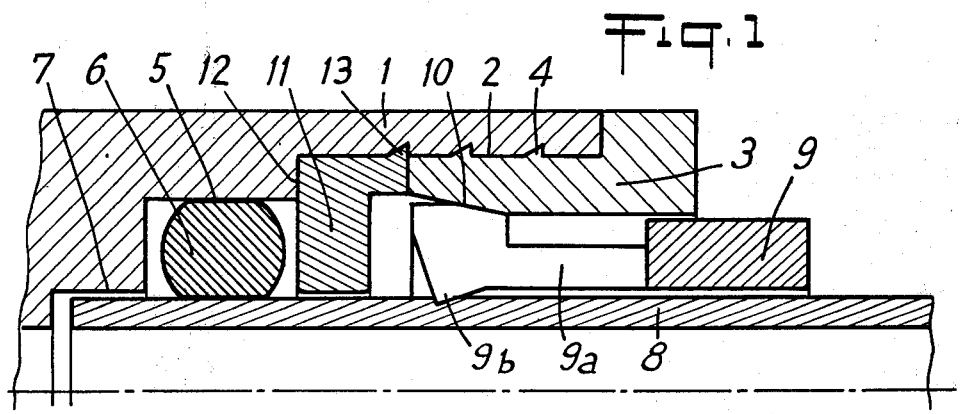
FIG. 1 is a view in section of a coupling comprising an external guide for a pipe.

In FIG. 1 there is shown a body 1 of a connector or coupling having a first bore 2 in which there is force fitted a ring 3, having teeth 4 engaged in the material forming the body.

Following the bore 2 there are provided a bore 5 receiving an O-ring 6 and a bore 7 receiving the end of a pipe 8, made of a semi-rigid material.

A clamp 9 is slidingly mounted in the ring 3 and has slits which define jaws 9a having at their ends edges 9b which are adapted to be engaged in the wall of the pipe 8 when the clamp abuts against a flared portion of the ring.

Further, there is provided an external guide for the pipe 8 consisting of an annular member 11 which is fitted into a bore 2 where it is at one side supported by the bottom 12 of the bore 2 and at the other side by the ring 3. The annular member 11 has barbs or wedges 13 engaged in the material forming the body 1.

The pipe 8 is engaged interiorly of the annular member 11 and is thus held against the O-ring 6 and the clamp 9.

Figure 2:
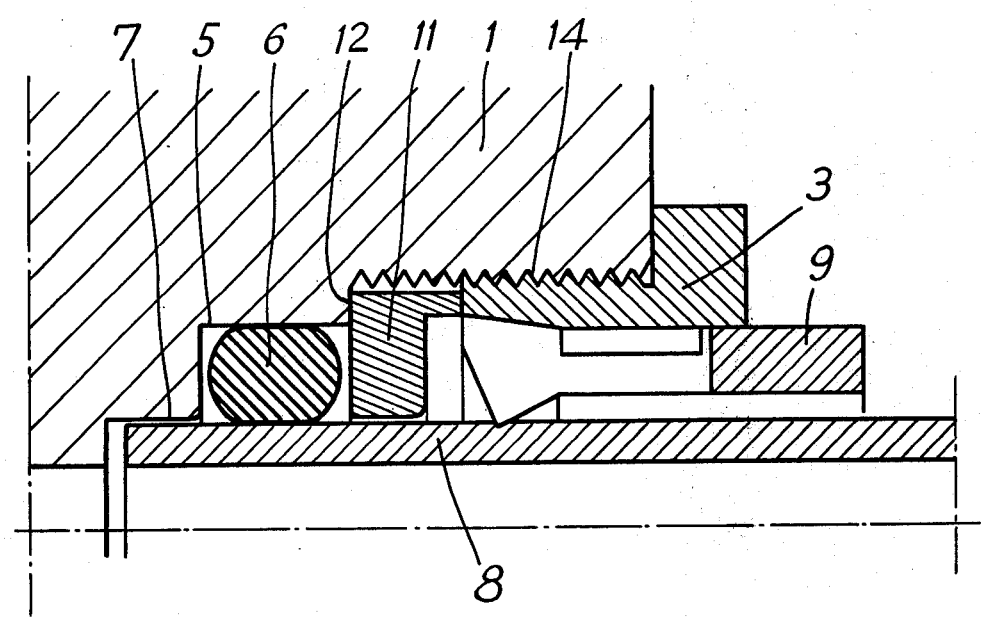
FIG. 2 is a view in section of a further embodiment of a coupling having an external guide for a pipe.

FIG. 2 shows a further embodiment of the connector wherein the body 1 has a threaded bore 14 into which the ring 3 is screwed. The annular member 11 is held squeezed between the bottom 12 and the ring 3.

Figure 3:
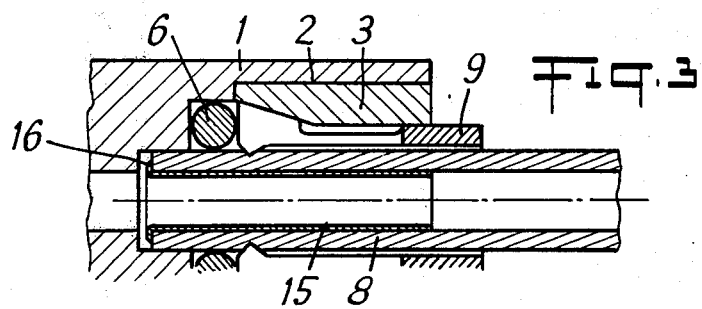
FIG. 3 is a view in section of a coupling having an internal pipe guide.

FIG. 3 shows a coupling device similar to that shown in FIG. 1 but with an internal member for guiding the pipe 8 replacing the external member, the said member consisting of a lining 15 engaged in the pipe 8. The lining 15 which is made of thin metal has an abutment collar 16 bearing against the end of the pipe 8. The lining 15 extends over all that portion of the pipe 8 which is engaged in the connector.

Figures 4, 5:
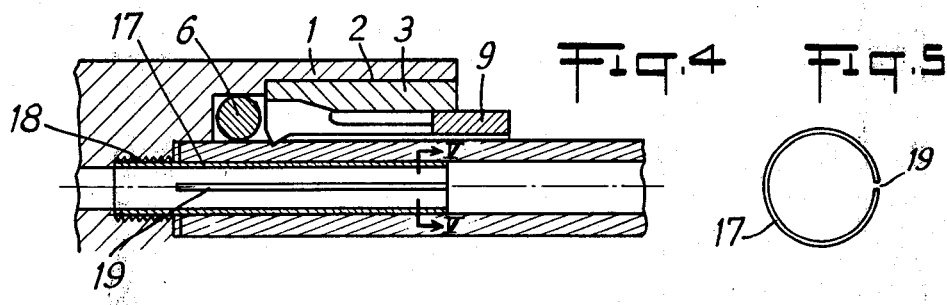
FIG. 4 is a view in section of a coupling having an internal pipe guide secured to a body.
FIG. 5 is a view in section taken along line V—V of FIG. 4.

FIGS. 4 and 5 show a coupling wherein the body 1 receives the end of a lining 17 the end 18 of which is secured in said body.

The other end of the lining 17 is engaged in the pipe 8. The lining 17 can be secured to the body 1 by any known means, for instance, force sleeve-jointing, welding, bonding or by thread means. At least one longitudinal slit 19 is provided in the lining 17 to permit the lining to be introduced into pipes of imperfect internal precision.

Figure 6:
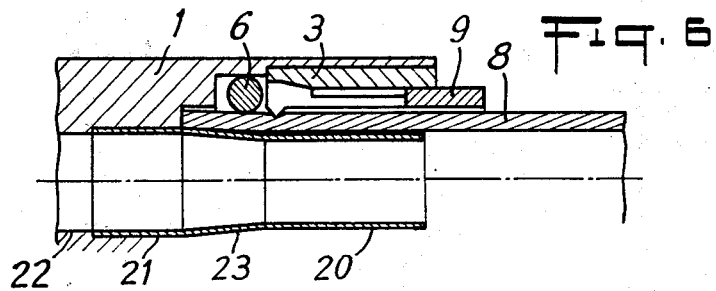
FIG. 6 is a view in section of a coupling having a modified internal guide for the pipe.

In FIG. 6 a lining 20 engaged in the pipe 8 is secured by its end 21 in a bore 22 of the body 1 and has a frusto-conical portion 23 which extends between the end 21 and the clamp 9. The object of this frusto-conical portion 23 is to slightly increase the tightening of the O-ring 6.

The lining can be made of very thin sheet metal which is cut out and rolled. An edge to edge rolled portion is intended for force sleeve-jointing into the body of the connector, a slit portion such as shown in FIGS. 4 and 5 being intended for sleeve-jointing in irregular pipes.

I claim:

1. A coupling comprising:
   a body member,
   a first bore in said body member,
   a second bore in said body member of smaller cross-section than said first bore and coaxially therewith to form a first annular shoulder,
   a third bore in said body member of smaller cross-section than the second bore and coaxial therewith to form a second annular shoulder,
   a fourth bore in said body member of smaller cross-section than said third bore and coaxial therewith to form a third annular shoulder,
   an annular conduit disposed in said first, second, and third bores and coaxial therewith,
   a ring member fitted in said first bore and having an internal surface which flares radially outwardly at the end thereof adjacent to the first shoulder,
   a flexible clamp between said conduit and said ring member, said clamp having a plurality of circumferentially spaced jaws carrying teeth on their radially inward side and embedded in said conduit, said jaws having a frusto-conically shaped surface on the radially outward side disposed against said flared internal surface of the ring member, an O-ring in said second bore, said O-ring being compressed between said conduit and said body member,
an annular guide lining fitted in said fourth bore and in said conduit, said lining having a length substantially that of said first bore, said second bore, said third bore and the portion of said fourth bore in which said conduit extends, and
said lining has at least one longitudinally extending slit therein which extends from the end thereof in said conduit, said slit having a length greater than that of said first bore and said second bore.

2. A coupling comprising:
a body member,
a first bore in said body member,
a second bore in said body member of smaller cross-section than said first bore and coaxially therewith to form a first annular shoulder,
a third bore in said body member of smaller cross-section than the second bore and coaxial therewith to form a second annular shoulder,
a fourth bore in said body member of smaller cross-section than said third bore and coaxial therewith to form a third annular shoulder,
an annular conduit disposed in said first, second, and third bores and coaxial therewith,
a ring member fitted in said first bore and having an internal surface which flares radially outwardly at the end thereof adjacent to the first shoulder,
a flexible clamp between said conduit and said ring member, said clamp having a plurality of circumferentially spaced jaws carrying teeth on their radially inward side and embedded in said conduit, said jaws having a frusto-conically shaped surface on the radially outward side disposed against said flared internal surface of the ring member,
an O-ring in said second bore, said O-ring being compressed between said conduit and said body member,
an annular guide lining fitted in said fourth bore and in said conduit, said lining having a length substantially that of said first bore, said second bore, said third bore and the portion of said fourth bore in which said conduit extends, and
the portion of said guide lining axially coextensive with said second and third bores is frusto-conically shaped and said O-ring is thereby compressed between said second bore in the body member and the portion of said conduit axially coextensive with said second bore.

* * * * *